E. R. BERRY.
SEAL FOR ARC LIGHT ELECTRODES.
APPLICATION FILED SEPT. 28, 1908.
918,500.
Patented Apr. 20, 1909.
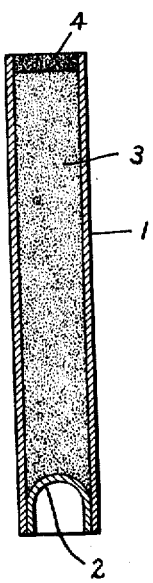
Witnesses
Inventor.
Edward R. Berry.
by
Atty.

UNITED STATES PATENT OFFICE.

EDWARD R. BERRY, OF LYNN, MASSACHUSETTS, ASSIGNOR TO GENERAL ELECTRIC COMPANY, A CORPORATION OF NEW YORK.

SEAL FOR ARC-LIGHT ELECTRODES.

No. 918,500.

Specification of Letters Patent.

Patented April 20, 1909.

Application filed September 28, 1908. Serial No. 455,186.

*To all whom it may concern:*

Be it known that I, EDWARD R. BERRY, a citizen of the United States, residing at Lynn, county of Essex, State of Massachusetts, have invented certain new and useful Improvements in Seals for Arc-Light Electrodes, of which the following is a specification.

My invention has reference to improvements in seals for arc light electrodes of the kind in which the electrode material proper is in a granulated or powdered condition and is packed in a metal tube, usually of cylindrical form. The electrode material proper is, or may be, either magnetite or carbid of titanium, or either of these substances mixed with others, and my invention has no reference to and is not limited to the use of any particular material.

In electrodes of the character above indicated, it has heretofore been customary to pack the electrode material in a metal tube and then seal or plug the arcing end by a small disk of sheet iron or of other metal. The sealing of this end of the electrode tube is absolutely necessary, since, otherwise, the powdered or granulated electrode material would in transportation and in handling be partly or wholly shaken out of the tube, making the electrode unfit for use. At the same time the sealing device must be of a character to insure the starting of the arc at the beginning of the operation; that is to say, the seal itself must be a conductor of electricity, and this is the reason why a metal disk was heretofore used for this purpose; but in using a metal disk as a seal or plug the initial arc was established between that metal disk and the other electrode and had, therefore, a different character than the arc yielded by the powdered electrode material compacted in the tube, and only after the metal disk had been consumed did the arc assume its normal form, color and brilliancy. This period of transition from the initial, abnormal arc, to the persistent, normal arc, is sometimes quite long, and this formed a serious objection to the use of these metal disk seals. Moreover, the seal itself was not always perfect, since the tube is rarely truly cylindrical, so that the disk would not always bear with its edge all around against the inner wall of the tube; therefore, some of the powdered electrode material in the tube would be shaken out of it in transit, so that some of the electrodes thus manufactured and shipped from place to place arrived at their final destination in a state in which they were unfit for use.

It is the object of my invention to overcome these difficulties, and I do overcome the same by providing an adhesive conducting seal for magnetite electrodes, titanium carbid electrodes, and other electrodes of this general character, the seal consisting of a mass compounded of the electrode material proper with some substance by which the mass is made plastic and adhesive, so that when forced into the end of the tube down into contact with the powdered electrode material which is compacted in the tube, it forms a close fitting and reliable seal that cannot be shaken out by rough handling in shipment or manipulation, and which, at the same time, yields an initial arc of the same character as the powdered electrode material itself.

In the accompanying drawing, which forms a part of this specification, my improvement is illustrated, the drawing showing a longitudinal axial section of a magnetite or a titanium carbid electrode, with my improvement applied thereto.

The electrode is shown as consisting of a tube 1 usually made of sheet iron or mild steel, the lower end of which is closed by a thimble 2 of the same material, forced into place. The electrode material 3 consists either of powdered magnetite and such admixtures as are usually employed, or of titanium carbid, or of any other substance used for arc light electrodes in a powdered state. On top of this compacted electrode material is placed my improved electrode seal or plug 4. This seal or plug is made by mixing a quantity of the electrode material powder with any suitable adhesive substance, such, for instance, as shellac, resin, or celluloid, either dissolved in a suitable volatile solvent, or dry and powdered. If shellac be employed—which is the preferred adhesive material, the same may be dissolved in alcohol and a quantity of electrode material mixed with it until a rather thin dough is obtained, and a small quantity of this mass is then pressed into the end of the tube and made flush with the upper edge of the tube. This seal or plug closely fits and strongly adheres to the inner wall of the electrode tube 1, and also to the underlying surface of the compacted electrode material 3, and when the solvent has evaporated the electrode is ready for shipment or use. Experience has shown that electrodes thus sealed do not become unsealed by the rough handling to which the electrodes are subjected, and the initial arc yielded by such an electrode has practically the same characteristics of shape, color and luminosity as the dry, powdered, compacted electrode material itself.

The thickness of the plug need not be gaged accurately, and it has been found that if the plug has a thickness of $\frac{1}{16}$ in. it serves its purpose perfectly well. In the drawing the thickness of the plug has been exaggerated for the sake of clearness of illustration.

Instead of using the adhesive material, say shellac, in solution, it may be used dry, being powdered and mixed with electrode material and heated until the mass becomes plastic, and is in that condition pressed into the end of the tube.

The same modes of making the seal or plug may also be employed with any other suitable adhesive material, such as resin, celluloid, or any other gum or adhesive material which when mixed with the electrode material yields a mass which is not appreciably inferior in conductivity to the electrode material proper. If the adhesive material is used in solution, the solvent will, of course, be chosen appropriately. Thus, for shellac alcohol would be the solvent; for ordinary resin turpentine might be used; for celluloid an acetate would be used.

In addition to the advantages of my improved electrode seal or plug above described, it has the additional advantage of being water-proof, which is quite an important feature.

What I claim as new and desire to secure by Letters Patent of the United States is,—

1. A plug or seal for an arc light electrode in which the electrode material is compacted in a tube, consisting of a mass compounded of the electrode material and an adhesive substance.

2. A plug or seal for an arc light electrode in which the electrode material is compacted in a metal tube, consisting of a mass compounded of the electrode material and an adhesive substance soluble in a volatile vehicle.

3. A plug or seal for an arc light electrode in which the electrode material is compacted in a metal tube, consisting of a mass compounded of the electrode material and a substance becoming plastic and adhesive under heat.

4. A plug or seal for an arc light electrode in which the electrode material is compacted in a metal tube, consisting of a mass compounded of the electrode material and shellac.

5. An arc light electrode, consisting of an iron tube with powdered electrode material compacted therein, and a water-proof adhesive plug having good electrical conductivity.

6. An arc light electrode, consisting of a tube with powdered electrode material compacted therein, and a plug of plastic conducting material yielding an arc of substantially the same character as the electrode material proper.

7. An arc light electrode, consisting of an iron tube filled with a powder in which carbid of titanium predominates, and a plug compounded of the same material mixed with an adhesive substance.

8. An arc light electrode, consisting of an iron tube filled with a powder in which carbid of titanium predominates, and a plug composed of the same powder mixed with shellac.

In witness whereof, I have hereunto set my hand this twenty-fifth day of September, 1908.

EDWARD R. BERRY.

Witnesses:
 JOHN A. McMANUS, Jr.,
 CHARLES A. BARNARD.